United States Patent [19]

Parsons

[11] 3,920,167

[45] Nov. 18, 1975

[54] AUTOMOBILE ROOF RACK

[75] Inventor: Ronald William Parsons, Tottenham, Canada

[73] Assignee: A L & W Sports

[22] Filed: Oct. 17, 1974

[21] Appl. No.: 515,575

[52] U.S. Cl. ........................................... 224/42.1 F
[51] Int. Cl.² ............................................... B60N 9/08
[58] Field of Search ...... 224/42.1 F, 42.1 G, 42.1 E;
248/226 R, 226 A, 226 B

[56] References Cited
UNITED STATES PATENTS

| | | | |
|---|---|---|---|
| 2,940,652 | 6/1960 | Willard | 224/42.1 G |
| 2,983,414 | 5/1961 | Fehr | 224/42.1 F |
| 3,385,488 | 5/1968 | Bronson | 224/42.1 F |
| 3,837,547 | 9/1974 | Joos | 224/42.1 F |

*Primary Examiner*—Robert R. Song

[57] ABSTRACT

A roof rack for an automobile has, at each end, downwardly extending struts which can fit into the rain gutter. To hold each strut in the gutter, a clip has a lower inturned elbow that can engage the underside of the gutter, and an upper inturned portion that can slide up the strut. A manually operable cam is rotatably supported from the strut outside the clip and can be rotated to press the clip to slide up the strut and draw the elbow under the gutter.

4 Claims, 4 Drawing Figures

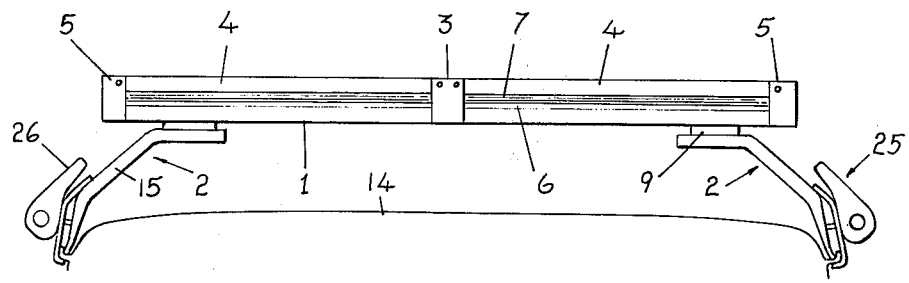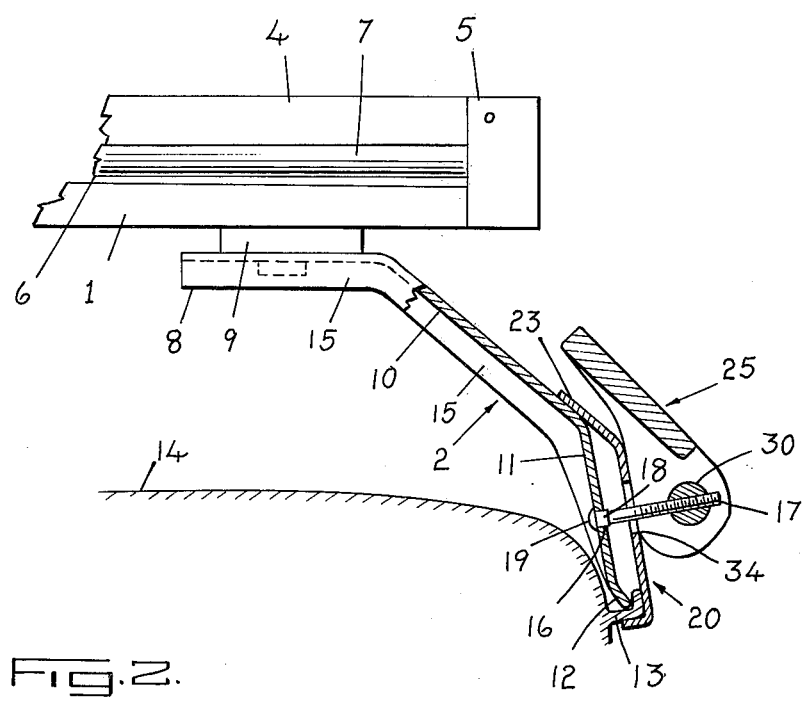

AUTOMOBILE ROOF RACK

BACKGROUND OF THE INVENTION

1. Field of the Invention

The invention relates to a roof rack which may be clamped to the roof of an automobile having a rain gutter along each lateral side of the roof.

2. Description of the Prior Art

There are many different roof racks which may be clamped to the rain gutter of an automobile. Some have clamping mechanisms which depend on the use of a separate tool, such as a wrench, for their operation, and this can be a nuisance. Roof racks whose clamping mechanisms are hand operated are also known but have tended to be complex, or to require substantial manipulation.

SUMMARY OF THE INVENTION

According to the present invention a strut at each end of a roof rack extends downwardly into the rain gutter and is clamped there by a clip which has a lower inturned elbow that extends under the gutter and an upper inturned portion that slides up the strut when the clip is pressed by a manually operable cam.

BRIEF DESCRIPTION OF THE DRAWINGS

A preferred embodiment of the invention is illustrated by way of example in the accompanying drawings in which:

FIG. 1 is a side elevation of a rack mounted on the roof of an automobile;

FIG. 2 is a enlarged, partly sectional view of the right hand end of FIG. 1;

DESCRIPTION OF THE PREFERRED EMBODIMENT

Figure 3:
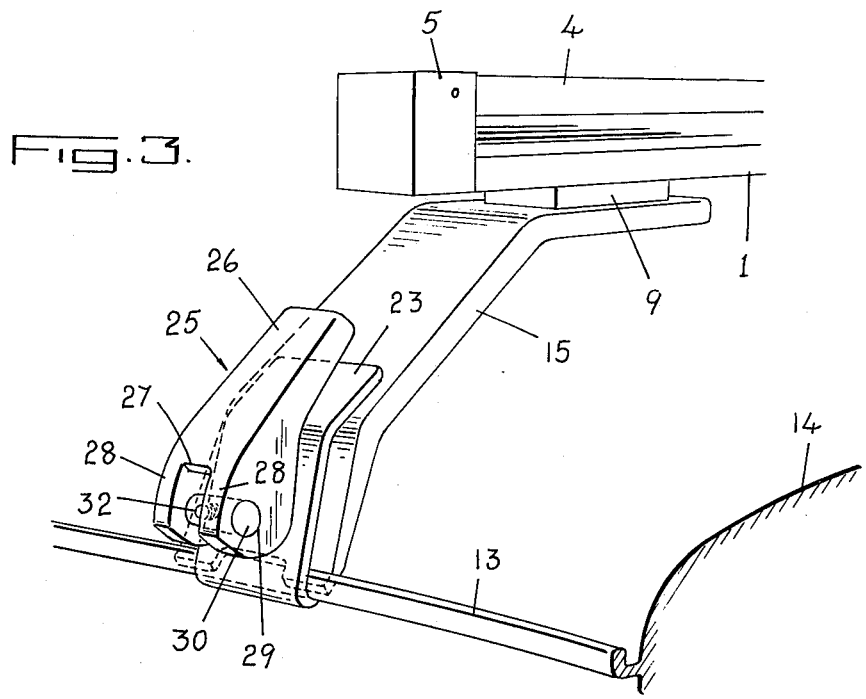
FIG. 3 is a perspective view of the structure shown in FIG. 2.

Referring to FIG. 1, the roof rack illustrated comprises a transverse member 1 terminating at either end with a downwardly sloping strut generally indicated by reference numeral 2. At the center of member 1 is a bracket 3 and a pair of arms 4 which are pivoted at their inner ends to the bracket 3 and can be held at their outer ends by latches 5 to member 1. When the latches 5 are released, the arms 4 can be swung upwardly about bracket 3 for insertion of skis or other articles between the member 1 and the arms 4, a strip of resilient padding 6 being provided on the upper surface of member 1 and a similar strip 7 being provided on the lower surface of each arm 4.

Referring to FIG. 2 each end strut 2 has an upper portion 8 which is parallel to the transverse member 1 and is connected to the transverse member 1 by an adjustable connection 9 which enables the strut 2 to be adjusted longitudinally on the member 1 to suit car tops of different widths. Each strut 2 has a first sloping portion 10 which slopes downwardly with respect to the longitudinal axis of the upper portion 8 and a second sloping portion 11 which slopes more steeply downwardly and terminates with an edge 12 engagable in the rain gutter 13 of an automobile roof 14, such a gutter being conventionally provided along each lateral side of an automobile roof. To provide rigidity each strut 2 has a channel shape with downturned flanges 15. Each flange 15 along the second sloping portion 11 of the strut 2 may be tapered to prevent mechanical interference with the contour of an automobile roof as clearly shown in FIG. 2. Located centrally in the second sloping portion 11 of the strut 2 is a square hole 16 into which is slidably inserted a bolt member 17. The bolt 17 has a square shaft portion 18 which fits snugly in the square hole 16, and a bolt head 19 bears against the underside of the strut 2 and prevents the bolt 17 from passing completely through the strut.

Figure 4:
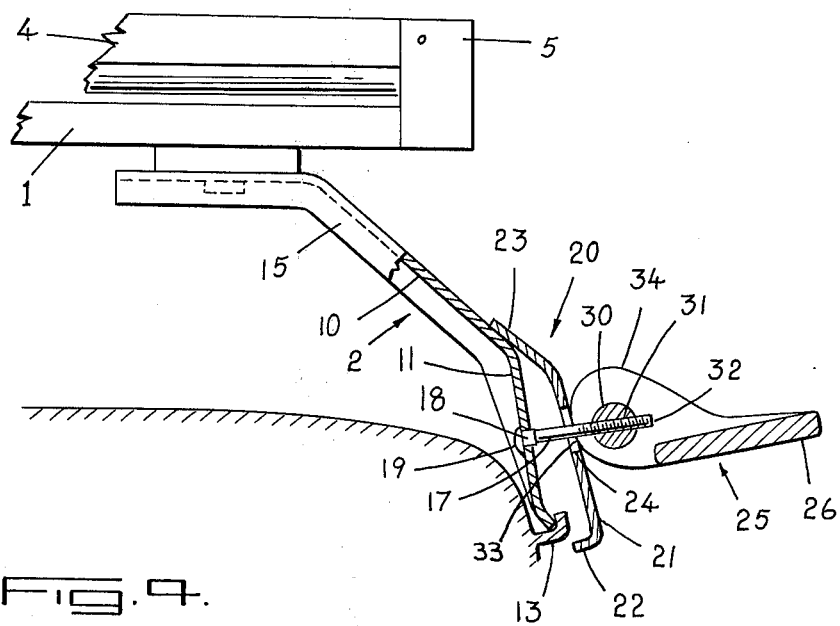
FIG. 4 is a view similar to FIG. 2 but showing the rack in an unclamped condition.

Referring to FIG. 4, a clip generally indicated by reference numeral 20 has a flat central portion 21, a lower inturned elbow 22 adapted to engage the underside of the gutter 13, and an upper inturned angle portion 23 which has substantially the same slope as the first sloping portion 10 of the strut 2. When the clamping operation is later described it will be seen that the first sloping portion 10 of the strut 2 acts as a track or guide along and up which the upper portion 23 of the clip can slide to draw the elbow 22 under the gutter 13. Located in the central portion 21 of the clip 20 is a rectangular hole 24 and the clip 20 is thereby slidably mounted on the bolt 17, said bolt passing through the rectangular hole 24. The clip 20, mounted as described, is free to slide up and down with respect to the bolt 17, such movement being limited by the length of the rectangular hole.

Referring to FIG. 3, a cam generally indicated by reference numeral 25 has a handle 26 and an aperture or slot 27 which divides the cam 25 into two identical camming portions 28, each camming portion 28 having a circular hole 29, said holes being in alignment with each other to receive a cylindrical bearing 30. The bearing 30 has a threaded hole 31 (see FIG. 4) perpendicular to the longitudinal axis of the bearing and located midway along the length of the bearing so that the threaded hole is accessible through the slot 27. The cam 25, with the bearing 30 positioned in the holes 29, can be screwed onto the threaded portion 32 of the bolt 17 which extends outwardly from the strut 2, said portion of the bolt threadably engaging the threaded hole 31 located in the bearing, and thus the cam 25 can be rotated about the axis of the bolt 17 until it is in the position shown in FIG. 4. The clamping operation can now be explained.

Referring to FIG. 4 the cam 25 has an eccentricity with respect to the bearing 30 so that a low point, shown at approximately 33, and a high point, shown at approximately 34, are defined. When the cam 25 is positioned relative to the bearing 30 so that the low point 33 is adjacent to the clip 20, as shown in FIG. 4, the strut 2 is unclamped and can be removed from the gutter 13. When the cam 25 is rotated couterclockwise as viewed in FIG. 4, the clip 20 is pressed by the cam 25 against the strut and slides up the first sloping portion 10 of the strut 2, thus drawing the elbow 22 under the gutter 13. When the cam has been rotated to the position shown in FIG. 2, the cam is engaging the clip 20 just past the high point 34 of the cam (at what may be termed an over-center position) and the strut is clamped in the gutter 13. If the cam is rotated back to the position of FIG. 4, the cam does not press the clip 20 under the gutter and the strut 2 can be removed from the gutter.

It will be appreciated that the cam 25 can be adjusted longitudinally on the bolt 17 to suit different rain gutter sizes. This may be accomplished by rotating the cam 25 and bearing 30 about the longitudinal axis of the bolt 17. Adjustment is limited only by the length of the threaded portion 32 of the bolt 17.

Modifications will of course occur to those skilled in the art and are intended to be covered by the following claims.

I claim:

1. A roof rack for mounting on the roof of an automobile having a rain gutter along each lateral side of the roof, said rack comprising a transverse member terminating in downwardly extending struts, each strut having an edge engageable in the rain gutter, a clip having a lower inturned elbow adapted to engage the underside of the rain gutter, and an upper inturned portion slidable against the downwardly extending strut, a manually operated cam, and means supporting the cam from the strut and retaining the clip between the cam and the strut, the cam being rotatable upon said support means to press the clip towards the strut and cause the clip to slide up the strut, thus drawing the elbow under the rain gutter and clamping the strut in the gutter.

2. A roof rack as claimed in claim 1 wherein each downwardly extending strut comprises a first portion which slopes downward from the longitudinal axis of the transverse member and a second portion with a steeper slope terminating with said edge engagable in the rain gutter, and wherein the upper inturned portion of the clip has substantially the same slope as the first portion of the strut so that pressing the cam against the clip causes the upper portion of the clip to slide along and up the first sloping portion of the strut, thus drawing the elbow under the rain gutter and clamping the strut in the gutter.

3. A roof rack as claimed in claim 1 wherein the support member comprises a bolt extending from the strut and passing through an aperture in the clip and a bearing threadably engaged on the bolt on which bearing the cam is rotatable.

4. A roof rack as claimed in claim 1 wherein the cam is rotatable on a bearing and has an eccentricity with respect to the bearing so that the cam has a high point and a low point, the cam being rotatable to press the high point against the clip, such rotation pressing the clip against the strut to slide up the strut, thus drawing the elbow under the rain gutter and clamping the strut in the gutter, the cam being also rotatable to locate the low point adjacent the clip without pressing the elbow under the gutter whereby the strut can be removed from the gutter.

* * * * *